Jan. 29, 1957     G. A. LE HEW     2,779,175
FRICTION DISC FOR A SLIPPING TYPE CLUTCH
Filed Jan. 3, 1955
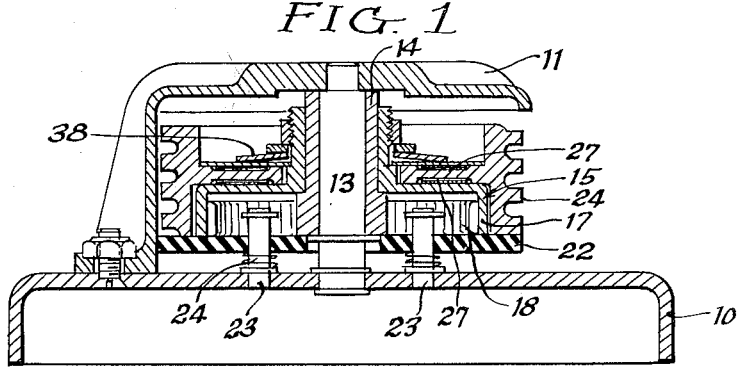
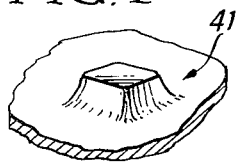
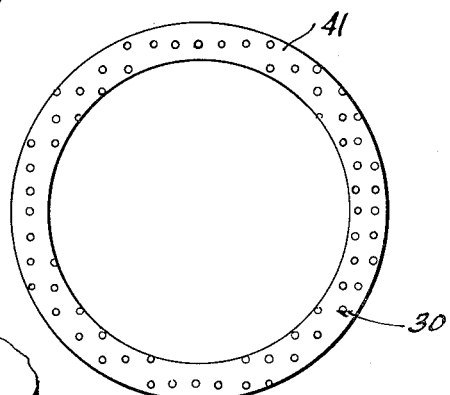
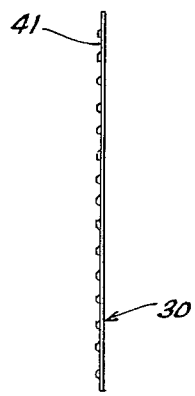
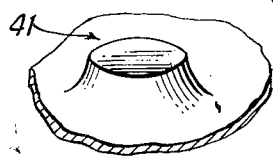
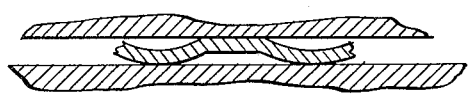
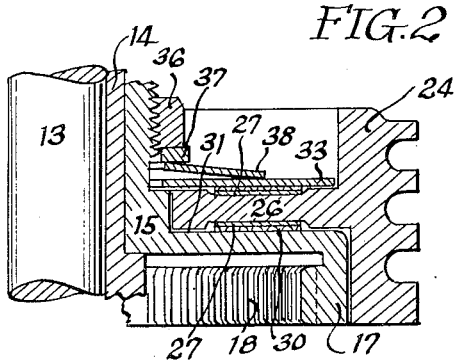
INVENTOR.
George A. LeHew
BY
Leonard H. King fred
Attorney

United States Patent Office 2,779,175
Patented Jan. 29, 1957

2,779,175

FRICTION DISC FOR A SLIPPING TYPE CLUTCH

George A. Le Hew, Grand Rapids, Mich., assignor to Lear, Incorporated, Grand Rapids, Mich., a corporation of Illinois Application January 3, 1955, Serial No. 479,411

1 Claim. (Cl. 64—30)

This invention relates to improvements in friction clutches. More particularly it has reference to a friction clutch which transmits torque by friction between relatively rotatable members coupled by a friction element and in which the amount of torque transmitted is adjustable or predeterminable by application of axial force of a spring.

Conventionally the load is transmitted through an annular disc adapted to slip relative to its adjacent members and, upon application of a load in excess of that which the clutch is designed to transmit, slippage occurs to protect the driving elements against damage. Where such clutches are subjected to a comparatively frequent slipping condition heat and wear give rise to problems which are best alleviated by lubrication of the slipping members. However, when the intermediate disc must be of metal and is flat, lubricant is not long retained. Desirably the intermediate ring or disc must possess some axial resiliency. To this end some designs have included annular or spiral corrugations which interfere with cooling of the members and hence reduce the maximum load which may be transmitted. In particular, annular corrugations tend to squeeze the lubricant away from the bearing areas. Radial corrugations have been tried but these too simply wipe the lubricant away from the bearing areas.

The present invention concerns itself with an improved disc or annulus for the purpose aforesaid which not only possesses the required axial resiliency but is capable of being properly lubricated over extended periods of operation.

Other objects will become apparent from the ensuing description which, taken together with the accompanying drawing discloses preferred forms of carrying the invention into practice.

In this drawing:

Figure 1 shows a longitudinal cross section of a capstan arrangement to which torque is transmitted through a slipping clutch including the invention improvement;

Fig. 2 is a fragment of Fig. 1 somewhat enlarged;

Fig. 3 is a detail in plan view showing my improved disc;

Fig. 4 is a side elevational view thereof;

Fig. 5 is a magnified cross section to illustrate the unstressed condition of the disc;

Fig. 6 is a view similar to Fig. 5 but showing the disc under pressure;

Fig. 7 is a perspective detail of one form of protuberance provided on the disc; and Fig. 8 is a similar view of an alternative form thereof.

While the invention disc will be described as incorporated in a specific clutch construction forming part of a specific device it will be apparent that the same may be broadly embodied and employed not only singly, as illustrated, but in multiple.

Referring to Figs. 1 and 2 the numeral 10 denotes a base or fixed support to which is secured a bracket 11 and between which base and bracket there is mounted a stud 13. A bushing 14 is arranged for rotation on the stud 13 and carries a clutch driving member 15 provided on a flanged portion 17 thereof with an internal gear 18 to which input power is applied from a driving source through a pinion (not shown). A dust cover 22 guided on posts 23 and urged by springs 24 prevents entry of foreign matter to the gear 18 and its associated pinion.

The driven member shown exemplificatively comprises a helically-grooved capstan 24 upon which a cable may be wound. For example such cable may apply power actuation to a control surface of an airplane and, in which application it is sometimes desirable to override the power source by manual operation of the pilot's stick. Thus a slipping type clutch will allow such operation and will, in addition, prevent damage to the clutch driving members in the event of jam or overload occurring on the output side.

The capstan is therefore provided with an annular radially-extending flange 26 preferably having annular recesses 27—27 in its opposite faces. However, such recesses are not essential and are provided in the present case to maintain the friction discs in a predetermined concentric position. It will be obvious that these discs may bear on simple flat faces of the flange 26 and, if concentric positioning is important, be suitably retained radially in such position.

Each recess 27 receives a friction disc 30 of the character shown in Figs. 3 and 4 and which will be described in detail hereinafter. A radially extending shoulder 31 serves as the opposed bearing face of the lower disc 30 and an annular bearing plate 33 serves the upper disc 30 in similar fashion.

Axial force is applied to the plate 33 and hence to the friction discs 30 by means of an adjustment nut 36 acting through a lock washer 37 and pressure plate 38 which is preferably a "Belleville" or saucer-shaped washer and hence resilient, although any equivalent arrangement may be employed for forcing the parts of the clutch into operating relationship. Obviously, the degree of pressure may be varied through the nut 36.

As thus far described the several elements are more or less conventional. However, the discs 30 are of novel construction and will now be elaborated upon.

Turning now to Figs. 3 and 4 the discs 30 each comprise an annulus of phosphor bronze or other resilient material of appreciable flexibility when considered within the environment of the particular clutch in which the invention is embodied. For example, in a clutch designed to transmit from 75 to 200 pound/inches the disc 30 is constructed of spring-tempered phosphor bronze of 0.008 inch thickness, has an internal diameter of 1¾ inches and an external diameter of 3⁹⁄₁₆ inches. At least one face of the disc is provided with a plurality of protuberances 41 having a configuration best seen in Fig. 5 and formed by indenting one face of the disc with a blunt-nosed punch which is flattened to a transverse dimension on the order of 0.006" to provide flat faces A spaced away from the body of the disc a distance B of approximately 0.007". The peripheral configuration of the faces A may be circular, polygonal or of other form (Figs. 7 and 8). For other materials of different thickness the dimensions A and B may be varied, the desideratum being that the areas of contiguity of the disc with its adjacent bearing members are essentially flat. While the relative lateral spacing of the protuberances 41 is variable within reasonable limits such dimension, in the example, is approximately 0.125 inch measured in perpendicular directions. However, the distribution may be random. Alternatively, the protuberances may be provided on both faces. However, in the case where the protuberances are on one face only such face is directed toward the flange 26, i. e., the floor of the recesses 27. For convenience in claiming the protuberances are sometimes referred to as horizontally truncated right pyramids or cones.

Optimum performance is obtained when lubrication is confined to those faces of the discs 30 which confront the flange 26. In this connection it must be explained that one of the paramount advantages of the invention construction lies in the maintenance of adequate lubrication over an extended period. Due to the small effective area of the protuberances 41 and their relatively wide spacing the area of lubricant in shear represents only a small proportion of the total available on the floor of the recesses 27. Accordingly, as relative slipping occurs the oil thrust away by travel of any protuberance is able to flow therearound and reunite with the main body of lubricant prior to the approach of a succeeding protuberance following the same circular path. By avoiding the disposition of these protuberances in concentric circles any selected protuberance may fall on a circle with at most only a few others thereof. Stated otherwise, there is, at no time, a sufficient number of protuberances sweeping out the same circular path so as to produce a non-lubricated annular zone, and therefore eventual galling of the flange 26.

Axial deformability is a prime requisite of a friction disc of the general class here involved. Due to the flattened configuration of the protuberances 41 corners 42 are presented between the flat portion 45 and the concave portion 46 bridging the same to the body of the disc (Fig. 5). Thus, under an axially-applied force the portion 46 may readily deform (Fig. 6) and, during such behavior, each protuberance and the zone immediately therearound acts essentially as a compression spring which, collectively, provide the desired spring action in the friction disc. Regardless of the lateral configuration of the protuberances the junction thereof with the body of the disc is essentially circular thereby promoting the desired spring action. Simple hemispherical dimples are inherently rigid and are not contemplated by the instant specification. Moreover this spring action compensates for surface imperfections found on the mating areas, and provides an area of predetermined size in continuous contact with such areas. The area of contact is substantially minimized, which reduces the area in shear at the instant slipping occurs, thereby stabilizing the torque output.

Although one particular embodiment of the invention has been shown and described in full here, there is no intention to thereby limit the invention to the details of such embodiment. On the contrary, the intention is to cover all modifications, alternative embodiments, usages and equivalents of the friction disc for a slipping type clutch as fall within the spirit and scope of the invention, specification and appended claim.

I claim:

In combination with a friction clutch of the disc type which includes a rotatable driving member and a rotatable driven member, each of the members being provided with substantially radially disposed confronting faces and means for applying axial coupling pressure to force the members together the improvement which comprises a torque-transmitting, thin, disc-like element positioned between said faces for coupling the members, said element being of resilient material and provided on at least one face with a plurality of struck-out protuberances, each protuberance having a flattened apex, the entire lateral wall portion thereof between said apex and the adjacent principal surface of said element being continuously curved concavely inwardly toward and merging into said surface whereby deformation of the element, when subjected to coupling pressure, will occur principally in the region of the several lateral wall portions.

References Cited in the file of this patent

UNITED STATES PATENTS 2,651,530    Blydenburgh _____ Sept. 8, 1953

FOREIGN PATENTS 578,289    Great Britain _____ June 21, 1946